Patented May 21, 1940

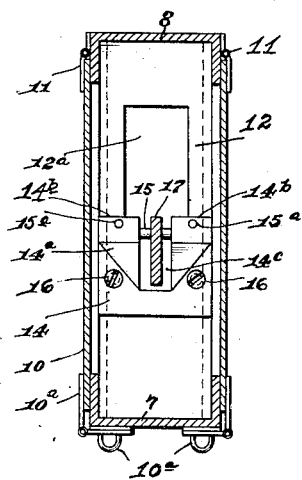

2,201,291

UNITED STATES PATENT OFFICE 2,201,291

BEAM SCALE

Joseph H. Gwynne, Camden, Ohio

Application June 2, 1937, Serial No. 146,061

1 Claim. (Cl. 265—49)

My invention relates to improvements in beam scales for weighing predetermined quantities of bulk material such as concrete aggregates, cement, grain, flour and the like.

A scale of this type has a considerable field of utility in connection with the mixing of concrete for construction work. The essential requirement of such a scale is that it shall readily indicate predetermined weights of the sand, cement, etc., and also the approach to such weights. Heretofore scales of this class have required the use of a dial and pointer indicator and a common specification of the various State highway departments is that the even balance indicator must move a definite, and relatively small distance for the last unit of weight under or over even balance that is placed upon the scale platform or in the associated hopper, whichever happens to be used. For instance, when weighing batches of say 500 pounds, it might be required that the indicator pointer move ⅛ of an inch for the last five pounds of weight under or over even balance. Heretofore it has not been considered practical to dispense with the dial type indicator and pointer despite the fact that same has proven objectionable, owing to extreme delicacy, lack of portability, expense, and lack of dependability due to sensitivity to friction caused by rust and dirt and for other reasons.

The primary object of my invention is to dispense with the necessity for the dial type indicator and to provide a scale wherein the scale beam provides the movable element of the indicator, there being means provided whereby all requirements for relative movement of the indicator in relation to definite weights can be met.

More specifically, it is the object of the invention to provide in combination with a beam of a scale a balance weight which is adapted to progressively resist swinging of the scale beam as the latter rocks toward the balanced position.

The invention also resides in certain novel features of construction, combination and arrangement of various parts, and in modes of operation, all of which will be readily apparent to those skilled in the art with reference to the accompanying drawings in connection with the detailed description to follow.

It is understood that the drawings illustrate what now appears to be a preferred example of the invention. However, it will be obvious that the inventive concept is susceptible of other mechanical expression within the spirit and scope of the subject matter claimed hereinafter.

In the drawings, wherein the same reference characters have been used to designate the same parts throughout the several views:

Figure 2 is a cross sectional view taken on line 2—2 of Figure 1;

Figure 3 is a cross sectional view taken on the line 3—3 of Figure 1;

Figure 4 is a cross sectional view taken on line 4—4 of Figure 1;

Figure 5 is a cross sectional view taken on line 5—5 of Figure 1;

Figure 6 is a perspective view of the fulcrum member shown in Figures 1 and 2; and Figure 7 is a perspective view of the weight member 30 and its bracket.

Figure 1:
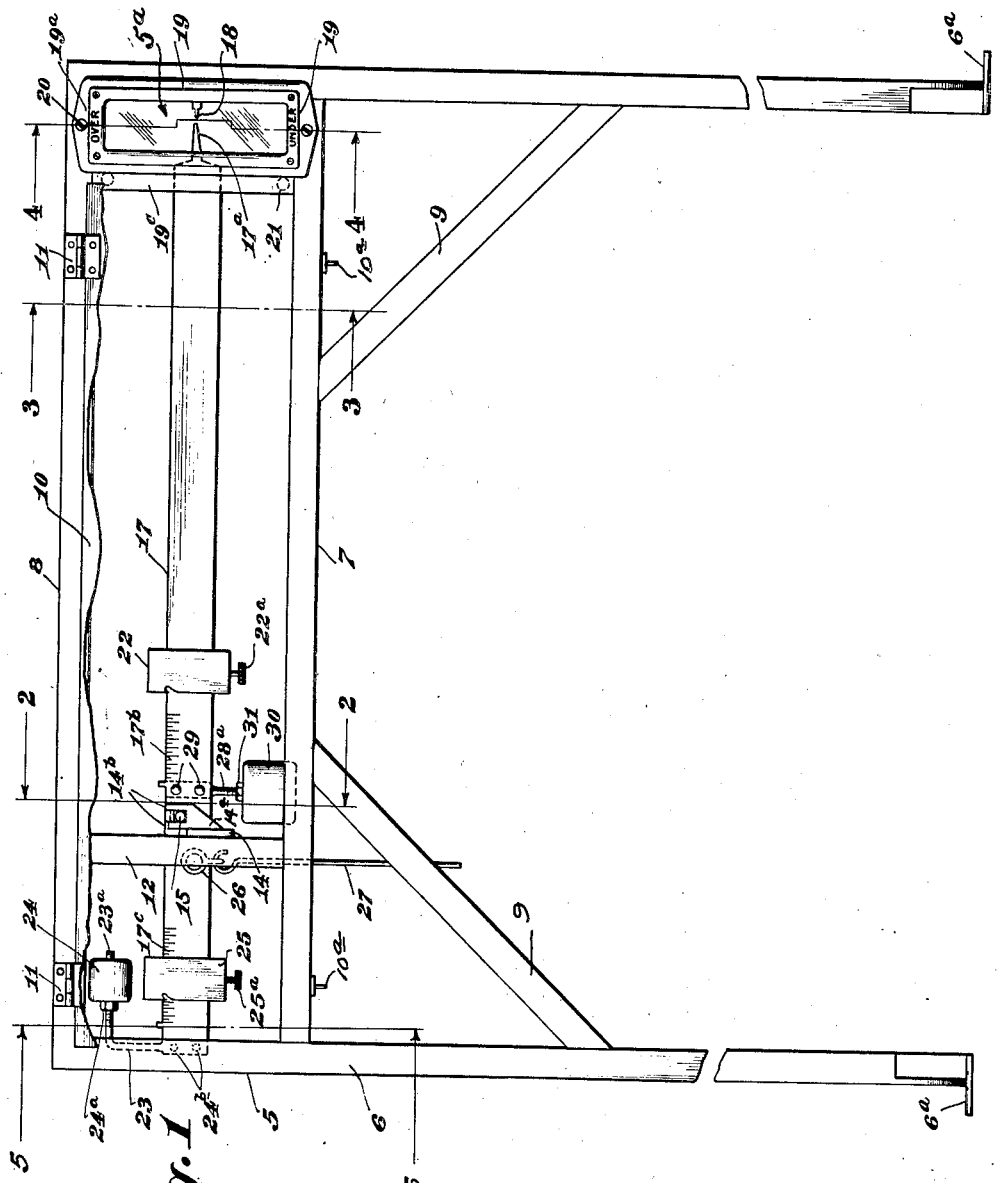
Figure 1 is a front elevational view of a beam scale embodying my invention.

Referring specifically to the drawings, numeral 5 designates generally a scale case provided by the channel iron end pieces 6 which are extended downwardly to provide supporting legs. Horizontal channel irons 8, 7 respectively, provide the top and bottom walls of the scale case. Doors 10 which are hinged as at 11 to the top channel 8 serve to close the sides of the case from one end to a point adjacent the other end, as shown in Figure 1. The doors 10 are adapted to be secured in closed position by means of hasps, 10a. The extended portion of the end walls 6, which provide the legs are suitably braced by channels 9, which are connected to the bottom wall 7. Suitable feet 6a are secured to the lower ends of the leg-providing end wall members 6 and these feet are adapted to be bolted to a floor or other support so as to hold the structure in upright position.

At a point inwardly spaced from the first-mentioned end of the case 5, there is provided the partition 12 in the form of a channel having its ends secured to the flanges of the channels 7, 8. This partition is provided with a substantially rectangular opening 12a and at either side of the lower portion of the latter are provided drilled holes receiving bolts 16 which secure a fulcrum member 14 against the partition 12 with the slot 14c aligned with the opening 12a. The fulcrum member 14 provides the medial thickened portion 14a extending forwardly of the plate-like portion of member 14 and provides the transversely bifurcated fulcrum portions 14b, which are adapted to receive the fulcrum pivot 15 of the scale beam 17 as shown in Figure 1. Pins 15a serve to retain the fulcrum pivot 15 of the scale beams 17 in the bifurcated fulcrum arms 14b.

The scale beam 17 has its forward end provided with the indicating pointer 17a and the opposite end wall of the scale case carries the cooperating fixed target or pointer 18.

Reference has hereinbefore been made to the fact that the doors 10 leave exposed the righthand end of the scale case. At the site of the last-mentioned ends of the doors 10 there are provided bars 19c connecting corresponding flanges of the top and bottom walls 7, 8. These bars 19c will be secured to the inner surfaces of the adjacent side flanges of the channels 7, 8 and cooperate with the channel members 6, 7, 8 to provide a rectangular opening 5a at each side of the scale case at the righthand end thereof as viewed in Figure 1.

A pair of duplicate frame-like members 19 of generally rectangular form carry the glass panes 19d and are adapted to be secured by screws 20 to the flanges of the channel members 7, 8 to overlie the margins of said rectangular opening 5a. The function of the glass pane-carrying frame-like members 19 is to exclude dust and dirt from the righthand end of the scale case while exposing the indicating pointer 17a of the scale beam and the stationary pointer of the target 18; and also to carry the legends 19a, 19b which indicate "Over" and "Under" weight respectively.

One bar 19c which connects the top and bottom channel members 7, 8 is provided with the inwardly extending pins 21, which are adapted to intercept the scale beam 17 and limit its swinging movement. These pins 21 will preferably be covered with rubber sleeves 21a for the purpose of absorbing the shock of impact of the scale beam 17. The frame-like members 19 preferably have their inner faces cut away inwardly from the outer edges to provide the endless shoulder 19x which engages against inner edges of the rectangular opening 5a which is provided by the bars 19c and the adjacent portions of the channels 6, 7, and 8.

Slideably mounted on the scale beam 17 at opposite sides of the partition 12 are the poises 22, 25, respectively, and these are adapted to be held in a set position by means of set screws 22a, 25a, respectively. The poise 22 is adapted to be set at a predetermined one of the weight-indicating scale beam graduations 17b for indicating a predetermined weight of material. The poise 25 cooperates with graduations 17c at the lefthand end of the beam 17 and serves as a counterpoise for making allowance for the weight of a wheel barrow, cart, truck, or the like, which may contain material to be weighed on the scale platform (not shown).

At the lefthand end of the scale beam 17— (Figure 1)—there is provided the angular rod 23 whose flattened end is riveted to one side of the scale beam 17 as indicated at 24. The angular rod 23 provides the threaded arm 23a exposed above the beam 17 and extending in the direction of the partition 12. Threadedly mounted on the arm 23a is the balance ball 24 and there is provided the jam nut 24a for holding the balance ball 24 in a set position. The function of the balance ball 24 is to effect initial balance of the scale beam.

Pivoted to the scale beam 17 adjacent and to the left of the partition 12 is the hanger 26 for the rod 27 which latter is designed for connection to the member which supports or receives the material to be weighed. This member may be a hopper receiving crushed stone cement or in fact any material from a suitable source of supply; or it may be connected in well known manner to scale platform.

As previously indicated, the present scale is intended for weighing predetermined fixed amounts and to indicate by the pointers 17a, 18 the approach to the predetermined fixed amount which is indicated by the position of the poise 22 on the scale beam 17.

Most states require that the indicators of scales of this character shall move a predetermined distance for the last unit of weight under or over the certain set amount for which scales of this kind are set. Such required indicator movement distances are relatively small when the set weight amount is small and proportionately higher when the set weight is higher. Considerable difficulty has been experienced by manufacturers in meeting the required range of indicator movement with a dial type indicator and same is open to the objections heretofore noted.

I am able to use scale beam pointer end 17a as the moveable indicator and thus overcome the objections to the dial type indicator, while at the same time readily meeting any requirement for indicator movement in relation to the set weight amount for which the scale is set. In carrying out this phase of the invention I provide the balance weight 30, shown in Figure 1, as threaded onto the lower threaded end 28a of a metal strap 28 which is riveted or otherwise secured as at 29 to the scale beam 17 at a point adjacent the fulcrum pivot 15. A jam nut 31 serves to lock the indicating balance weight 30 in set position.

By way of summary the operation of the scale is explained as follows:

First, the case 5 or its support, which may be the legs 6 or a dispensing hopper apparatus with which the scale case is associated is set in substantially level position. Next, both of the poises 22, 25 are set at the zero point of their scale graduations 17b, 17c. Following this, the balance ball 24 is adjusted on the threaded shank 23a of rod 23 until the pointer 17a accurately registers with the target 18. Then the jam nut 24a is tightened up to hold the balance ball 24 in the set position.

The scale is now ready for use and the poise 22 is set for the predetermined weight of the batches of material to be weighed. For the purpose of illustration, it will be assumed that batches of 500 pounds of concrete aggregate are to be weighed; and furthermore that the State requirement is that the pointer of the indicator— 17a in my apparatus—must move ⅛ of an inch for the last five pounds of weight under or over the set weight amount. In order to arrive at this adjustment, a balance weight 30 of proper size is selected and screwed onto the threaded end 28a of the metal strap 28. Then a five pound weight is placed in the hopper or upon the scale platform—neither shown—which is connected to the rod 27. The distance that pointer 17a moves under the action of such given pound weight is then noted and if such distance is greater or less than ⅛ of an inch, correction can be made by adjusting the balance weight 30 up or down on the threaded portion 28a of strap 28. The further the weight 30 is from the beam 17, the shorter will be the distance that pointer 17a will move under the influence of a given weight attached to rod 27. This is true because strap 28 is fixedly attached to scale beam 17 in advance of fulcrum pivot 15, from which it follows that the further beam 17 swings upwardly the greater will be the distance from weight 30 to fulcrum pivot 15. It is therefore not necessary that the selected weight 30 be exactly of the size required to restrict pointer 17a to a certain length of movement for each unit of weight carried by rod 27 as would be the case if weight 30 was not adjustable on portion 28a of strap 28.

When the scale is incorporated in a hopper type apparatus it would not be necessary to adjust the poise 25. But on the other hand, if rod 27 has connection with a platform and the material to be weighed is contained in cans, wheel barrows, or the like, allowance for the weight of such containers would have to be made. This is accomplished in obvious manner by simply disposing an empty container on such platform and then by movement of the poise 25 restoring the pointer 17a to alignment with target 18.

When the scale is incorporated in a hopper type weighing apparatus the operator would simply observe the approach of pointer 17a to alignment with the target 18 and would cut off the flow of material into the hopper at the proper time.

When material is being weighed in containers the operator would simply add or remove the material from the container until the pointer 17a registers with target 18.

The doors 10 serve to exclude dirt from the scale case 5, leaving exposed only the pointer 17a and the target 18 through the glass panes 19d.

A scale of this construction will obviously stand very hard usage as it comprehends no delicate parts. Furthermore, it embodies no parts which will be adversely affected by rust or dirt.

It might be mentioned further that bars 19c may be replaced by a slotted channel similar to partition 12. Such arrangement would further promote the exclusion of dust from the fulcrum 16 within case 5.

In many cases the balance weight 30 will be selected, applied and fixedly set at the factory to meet a customer's requirements.

As stated earlier herein the particular details of construction shown and described can be varied and changed materially without departing from the spirit and scope of the invention. This applies especially to the location of the balance weight 30, and the pointer and target 17a, 18.

Having thus described my invention, what I claim as new is:

In a beam scale, a case, supporting standards therefor, a partition extending transversely of the case adjacent one end portion thereof, said partition being vertically slotted, a block secured to one face of said partition and slotted to correspond, a bearing bracket carried by said block at each side of the slot and extending in the direction of the farther end of the case, a scale beam fulcrumed in said bearing brackets and oscillatable vertically through said partition slot, a weight fixed on said beam between its fulcrum point and the end farthest therefrom, said weight being adjustable toward and away from said beam, load supporting means on the beam at the opposite side of its fulcrum, and a variable poise on said beam at each side of its fulcrum.

JOSEPH H. GWYNNE.